(12) United States Patent  
Ho

(10) Patent No.: US 6,957,014 B2  
(45) Date of Patent: Oct. 18, 2005

(54) LIQUID HEATER

(76) Inventor: Lil Achmad Ho, 8 The Riverwalk, Ascot, Western Australia (AU), 6104

( * ) Notice: Subject to any disclaimer, the term of this patent is extended or adjusted under 35 U.S.C. 154(b) by 71 days.

(21) Appl. No.: 10/874,997

(22) Filed: Jun. 23, 2004

(65) Prior Publication Data

US 2005/0025471 A1 Feb. 3, 2005

Related U.S. Application Data

(63) Continuation of application No. PCT/AU02/01755, filed on Dec. 23, 2002.

(30) Foreign Application Priority Data

Dec. 24, 2001  (AU) ............................................. PR9740

(51) Int. Cl.[7] ................................................ F24H 1/18
(52) U.S. Cl. ...................... 392/449; 392/454; 392/455; 165/104.19
(58) Field of Search ................................ 392/454, 455, 392/481, 490, 449; 165/10, 104.11, 104.19

(56) References Cited

U.S. PATENT DOCUMENTS

| | | | | |
|---|---|---|---|---|
| 4,180,055 | A | * 12/1979 | Hudnall ...................... | 126/658 |
| 4,436,983 | A | * 3/1984 | Solobay ...................... | 392/490 |
| 4,567,350 | A | * 1/1986 | Todd Jr. ..................... | 392/486 |
| 5,657,745 | A | 8/1997 | Damminger ................. | 126/633 |
| 5,866,880 | A | * 2/1999 | Seitz et al. .................. | 219/483 |
| 6,119,682 | A | * 9/2000 | Hazan ......................... | 126/638 |
| 6,363,218 | B1 | * 3/2002 | Lowenstein et al. ........ | 392/498 |
| 6,701,069 | B1 | * 3/2004 | Cezayirli et al. ........... | 392/490 |

FOREIGN PATENT DOCUMENTS

| | | | |
|---|---|---|---|
| AU | 25280/84 | 9/1985 | ........... F24D/17/00 |
| DE | 3819243 | 12/1989 | ............. F24J/2/00 |
| JP | 07-280360 | 10/1995 | ............. F24J/2/42 |
| JP | 2000-346450 | 12/2000 | ............. F24H/1/00 |
| JP | 2001-289506 | 10/2001 | ............. F24H/1/00 |

OTHER PUBLICATIONS

International Search Report based on PCT/AU02/01755 dated Dec. 24, 2001.

* cited by examiner

*Primary Examiner*—Thor S. Campbell  
(74) *Attorney, Agent, or Firm*—Kathleen M. Williams; David J. Dykeman; Palmer & Dodge, LLP

(57) ABSTRACT

A liquid heater comprising a plurality of storage compartments for containing liquid to be heated. The storage compartments being connected together in series and comprising at least a first end compartment for receiving liquid to be heated and a second end compartment from which heated liquid can be drawn. A heating means is provided in each compartment for heating the liquid contained therein. A first flow control means is operable to allow liquid in one compartment to flow into the next compartment in a flow direction towards the first end compartment when liquid contained in said one compartment reaches a predetermined temperature. A second flow control means is operable to allow liquid flow from one compartment to the next compartment in a flow direction towards the second end compartment while preventing reverse flow.

20 Claims, 6 Drawing Sheets

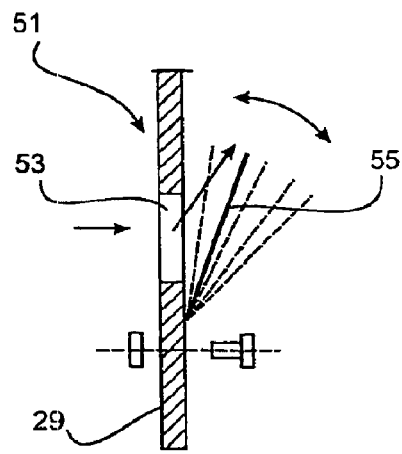
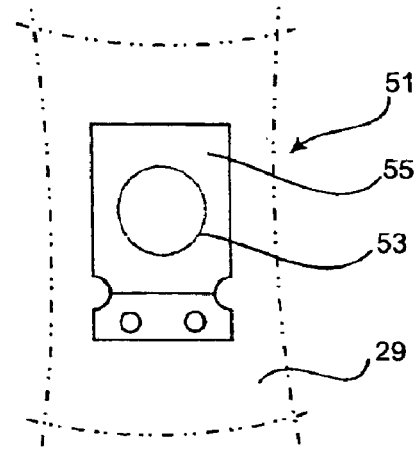
Fig. 3.  Fig. 4.
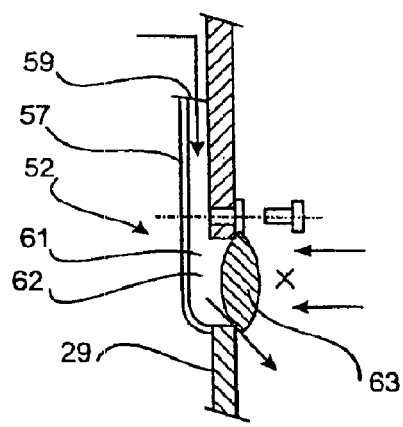
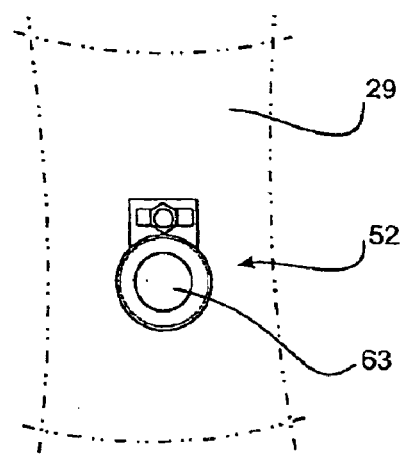
Fig. 5.  Fig. 6.

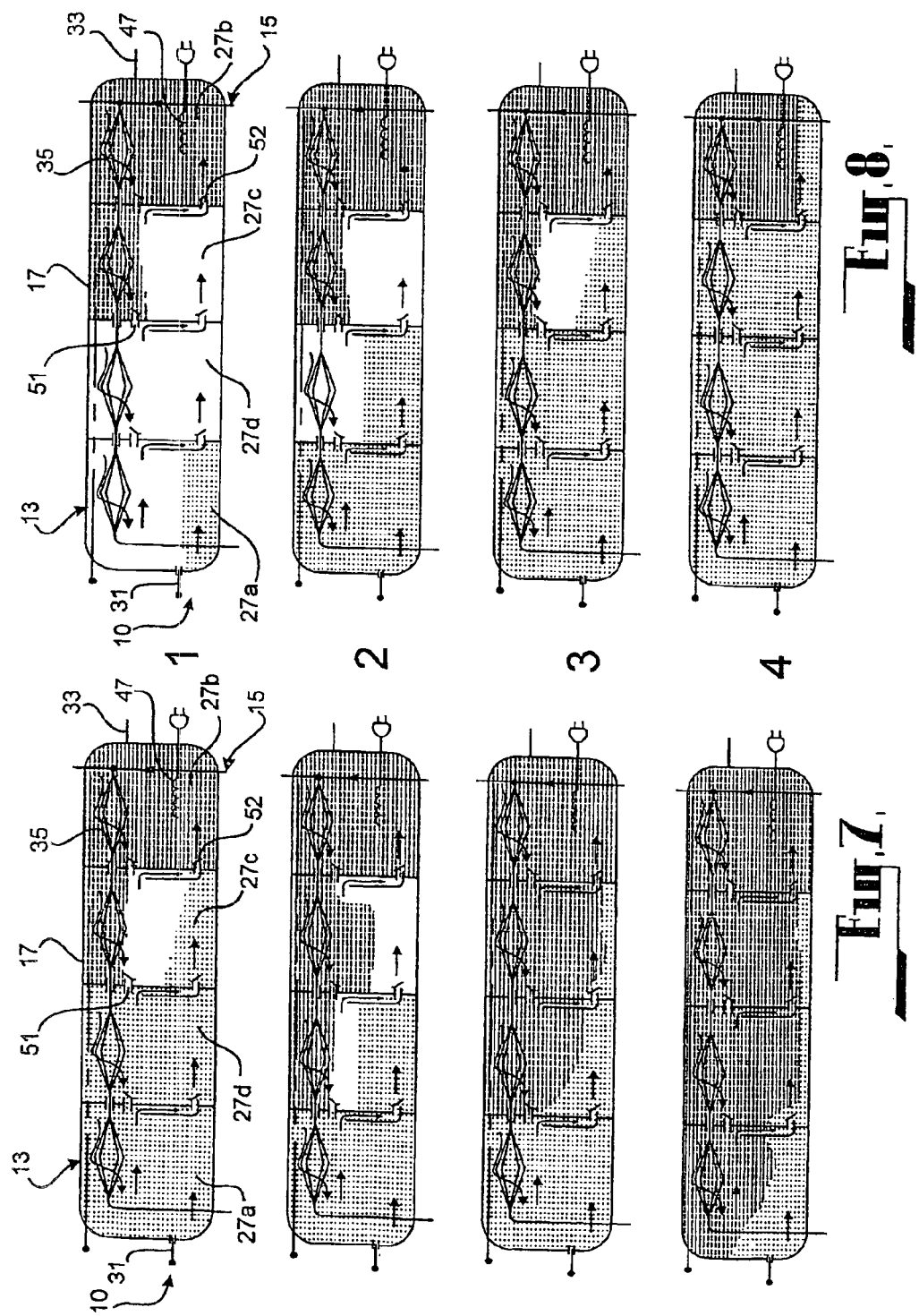

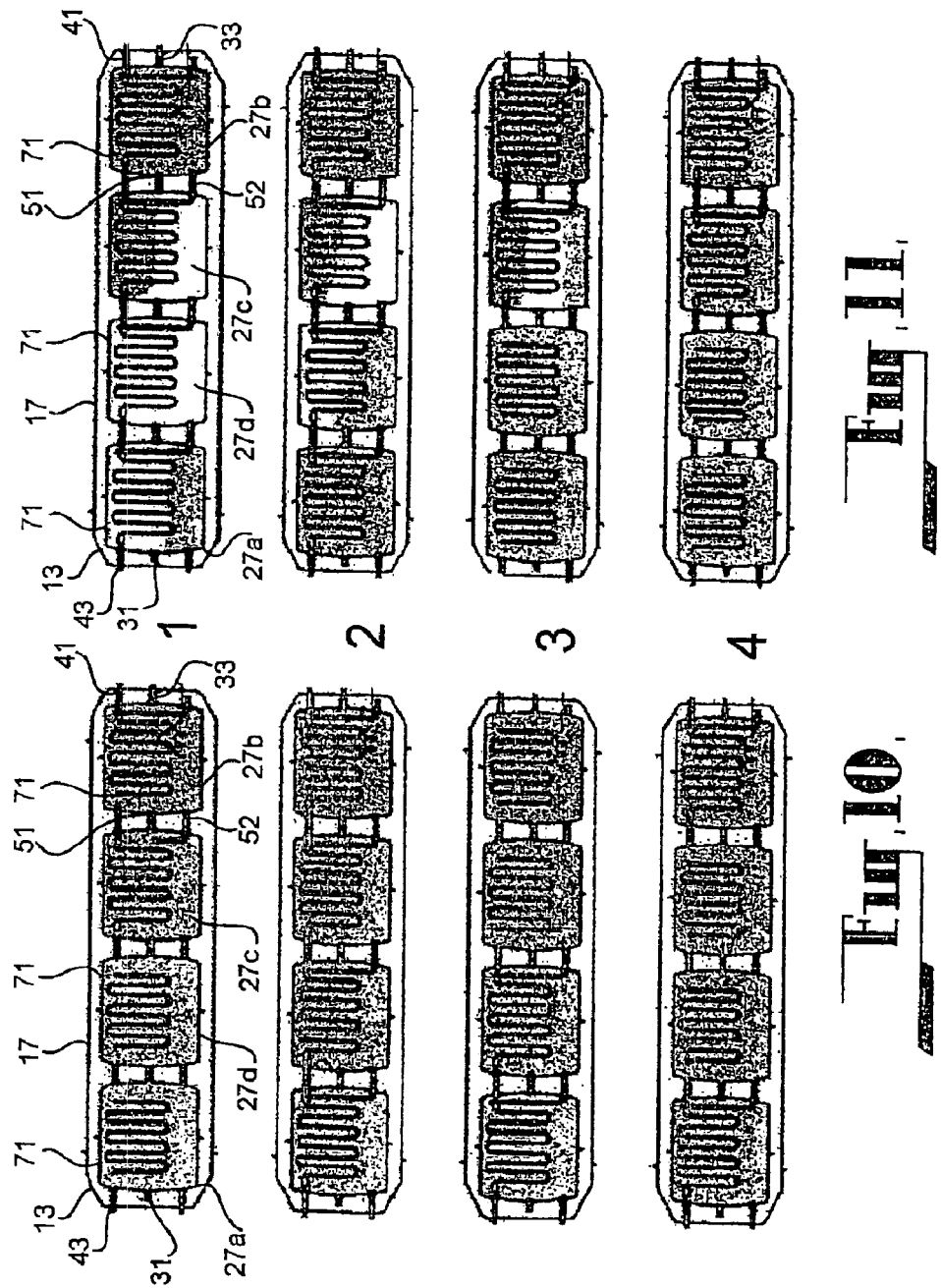

LIQUID HEATER

RELATED APPLICATIONS

This application is a continuation of PCT/AU02/01755, filed Dec. 23, 2002, which claims priority to Australian Patent Application PR 9740, filed Dec. 24, 2001, the entirety of these applications are incorporated herein by reference.

FIELD OF THE INVENTION

This invention relates to a liquid heater.

The invention has been devised particularly, although not solely, as a water heater utilising solar radiation as a primary heat source. It should, however, be appreciated that the liquid heater according to the invention may be used for liquids other than water and may employ a heat source other than solar radiation, such as the heated gas in an airconditioning unit.

BACKGROUND ART

Solar water heaters generally comprise a solar radiation collector, a water storage tank and a heat transfer system for transferring heat collected at the collector to the water contained in the storage tank. Water within the storage tank is progressively heated by heat transferred to it from the solar radiation collector. Typically, there is a supplementary heating device, such as an electrical heater, for heating the water in the storage tank in circumstances where there is insufficient solar radiation for such purposes, such as for example on cloudy days.

At times when there is insufficient solar radiation and supplementary heating is required, a considerable amount of energy can be expended in heating the volume of water contained in the storage tank, both in terms of available energy from solar radiation and energy delivered by the supplementary heating device. It can therefore be wasteful to heat the entire volume of water, particularly as there may only be a small volume of hot water required. Additionally, the time taken to heat the entire volume of water to a desired temperature can be considerable, so causing delays in the availability of even a small volume of hot water.

It is against this background, and the problems and difficulties associated therewith, that the present invention has been developed.

DISCLOSURE OF THE INVENTION

The present invention provides a liquid heater comprising a plurality of storage compartments for containing liquid to be heated, the storage compartments being connected together in series and comprising at least a first end compartment for receiving liquid to be heated and a second end compartment from which heated liquid can be drawn, a heating means in each compartment for heating water contained therein, a first flow control means operable to allow liquid in one compartment to flow into the next compartment in a flow direction towards the first end compartment when liquid contained in said one compartment reaches a predetermined temperature, and a second flow control means operable to allow liquid flow from one compartment to the next compartment in a flow direction towards the second end compartment while preventing reverse flow.

The compartments may be defined by a reservoir such as a tank partitioned to provide the compartments. It should, however, be appreciated that other arrangements are possible, such as for example a plurality of reservoirs arranged in series to each define one of the compartments.

The heating means in each compartment may comprise a heat exchanger. In one arrangement, the heat exchanger may be thermally connected to a solar radiation collector. The thermal connection between the heat exchanger and the solar radiation collector may comprise a fluid circuit containing a heat transfer fluid, with the heat transfer fluid receiving heat from the solar radiation collector and transferring it to the liquid in the compartments through the heat exchangers. Typically, the heat exchangers are incorporated in series in the fluid circuit. The heat transfer fluid contained in the fluid circuit may comprise any appropriate fluid such as, for example, distilled water.

Each heat exchanger may be of any appropriate construction. A particularly appropriate construction of heat exchanger involves a plurality of flow paths arranged in parallel and configured in a spiral arrangement. The flow paths are not necessarily parallel in a geometric sense but rather parallel in the sense of a circuit where the flow is divided into separate paths as opposed to being in series. Another appropriate construction of a heat exchanger involves a plurality of flow paths arranged in a stacked formation and configured in a meandering arrangement.

The liquid heater may be provided with a supplementary heating means to supplement the solar heating means. The supplementary heating means may be of any appropriate form such as, for example, an electric heater. Where a supplementary heating means is provided, it is preferably arranged to heat liquid contained in the second end compartment.

Preferably, the first flow control means is located above the second flow control means. With such an arrangement, the first flow control means is exposed to hotter water (which rises towards the upper section of each compartment) and the second flow control means is exposed to cooler water (which settles towards the lower section of each compartment).

The first flow control means may comprise a first flow path and a control valve for opening and closing the first flow path, the control valve moving from the closed condition to the open condition when the water temperature in the particular compartment reaches said predetermined temperature. It need not be necessary for all of the water in the compartment to reach the predetermined temperature but typically only a designated portion of that water. In this embodiment, it is the temperature of water in contact with the control valve that is relevant.

The second flow control means may comprise a second flow path and a valve operable to allow liquid to flow along the second flow path in a flow direction towards the second end compartment while preventing flow along the second flow path in the reverse direction.

The second flow path may be defined by a duct having an intake end and a discharge end, with the intake end being located above the discharge end. For any particular compartment, the intake end of the duct through which liquid can leave that compartment is located in close proximity to the respective first flow path through which liquid can enter that compartment.

BRIEF DESCRIPTION OF THE DRAWINGS

The invention will be better understood by reference to the following description of several specific embodiments thereof as shown in the accompanying drawings in which:

FIG. 3 is a cross-sectional side view of a first flow control means incorporated in the heater;

FIG. 4 is a front view of the first flow control means;

FIG. 5 is a cross-sectional side view of a second flow control means incorporated in the heater;

FIG. 6 is a front view of the second flow control means;

FIG. 7 is a sequence of four schematic views illustrating hot water flow through various compartments within the heater during operation thereof;

FIG. 8 is a view somewhat similar to FIG. 7 with the exception that cold water flow is illustrated;

FIG. 10 is a sequence of four schematic views illustrating hot water flow through various compartments within a solar water heater according to a third embodiment; and FIG. 11 is a view somewhat similar to FIG. 9 with the exception that cold water flow is illustrated.

BEST MODE(S) FOR CARRYING OUT THE INVENTION

Figure 1:
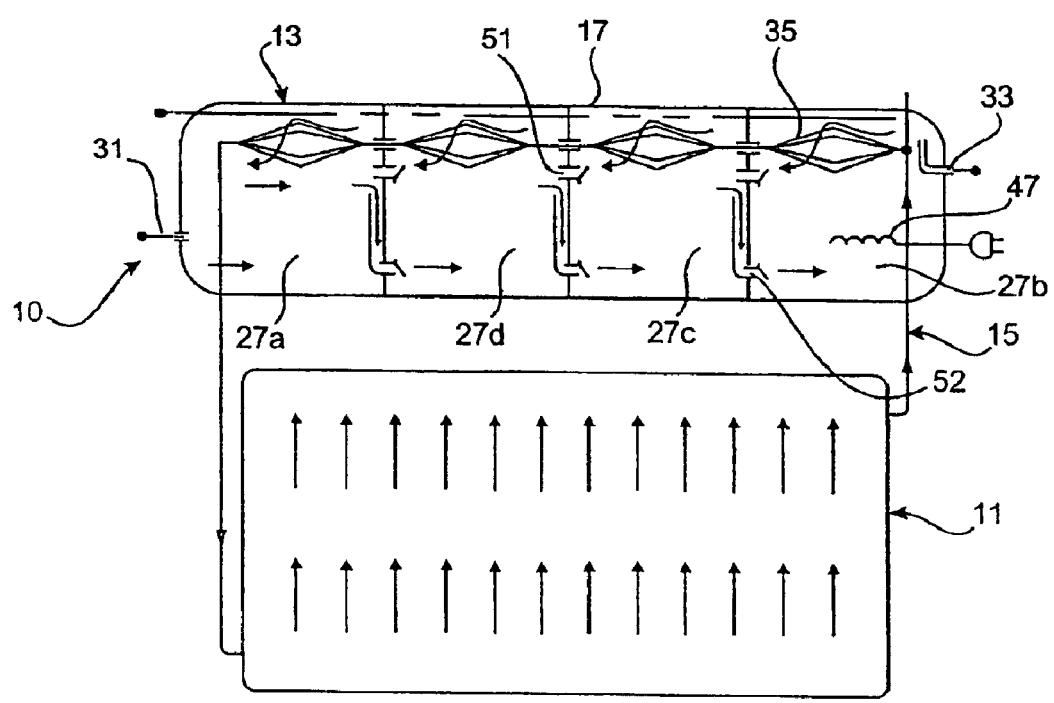
FIG. 1 is a schematic view of a solar water heater according to a first embodiment.

Referring to FIGS. 1 to 8, there is shown a first embodiment that is directed to a solar water heater 10 comprising a solar radiation collector 11, a storage tank 13 and a fluid circuit 15 containing a heat transfer fluid for transferring thermal energy collected by the collector 11 to water contained in the tank 13.

The heat transfer fluid may comprise distilled water.

The collector 11 may be of any suitable construction. A particularly appropriate form of collector 11 is a collector of the type disclosed in the applicant's Australian Innovation Patent 2002100327 entitled "Solar Collector", the contents of which are incorporated herein by way of reference.

The tank 13 comprises a housing 17 having an outer wall structure 19 and an inner wall structure 21 in spaced apart relationship to define a space 23 therebetween to provide a thermally insulating effect. This may be enhanced by placing the space under vacuum conditions or filling it with an insulating material.

A chamber 25 is defined within, and surrounded by, the inner wall 21. The chamber 25 is divided into compartments 27 by partitions 29. In this embodiment, there are three partitions 29 dividing the chamber 25 into four compartments 27, comprising a first end compartment 27a, a second end compartment 27b, and two intermediate compartments 27c and 27d between the two end compartments 27a, 27b.

An inlet 31 is provided for introducing water to be heated into the chamber 25. The inlet 31 opens onto the first end compartment 27a, as best seen in FIG. 2 of the drawings.

An outlet 33 is provided for drawing heated water from the compartment 25. The outlet 33 communicates with the second end compartment 27b, also as shown in FIG. 2 of the drawings.

Each compartment 27 includes a heating means 35 for heating water contained therein. In this embodiment, each heating means 35 comprises a heat exchanger incorporated in the fluid circuit 15 such that heat transfer fluid flowing around the circuit 15 passes successively through the heat exchangers, commencing with the heat exchanger 35 in the second end compartment 27b and concluding with the heat exchanger 35 in the first end compartment 27a.

Figure 2:
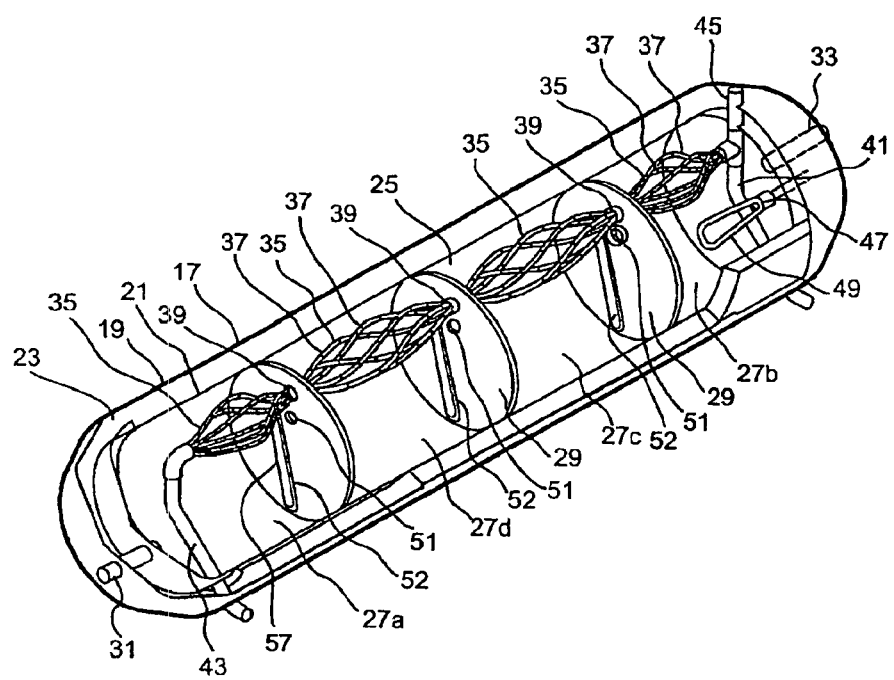
FIG. 2 is a partially cut away schematic perspective view of part of the heater.

The heat exchangers 35 are configured from a multitude of flexible pipes, such as copper pipes 37 arranged in parallel, with the section of pipe in each compartment 27 being configured into somewhat of a spiral formation, as best seen in FIG. 2 of the drawings. The pipes 37 extend between the compartments 27 through sealed apertures 39 in the respective partitions 29.

The pipes 37 extend in a parallel flow sense from an inlet line 41 to an outlet line 43, both of which are incorporated in the flow circuit 15. The inlet line 41 includes a branch section 45 through which the heat transfer fluid can be introduced into the fluid circuit as necessary.

The second end compartment 27b is also provided with a supplementary heating device 47 to provide supplementary heating to water in that compartment in circumstances where thermal energy delivered from the collector 11 is insufficient. Typically, such a situation could arise on cloudy days where there is insufficient solar radiation to heat the water to a prescribed temperature, therefore requiring supplementary heating through the heating device 47. In this embodiment, the heating device 47 is in the form of an electric heater having a heating element 49 immersed in water contained in the second end compartment 27b.

Each partition 29 incorporates a first flow control means 51 operable to allow water in one compartment to flow into the next compartment in a flow direction towards the first end compartment 27a when water contained in said one compartment reaches a pre-determined temperature, which in this embodiment is about 70° C. Each partition wall 29 also incorporates a second flow control means 52 operable to allow water flow from one compartment to the next compartment in a flow direction towards the second end compartment 27b while preventing reverse flow, in compensation for water flow through the first control means 51.

In this embodiment, each first flow control means 51 comprises a first port 53 in the respective partition 29 to provide a first flow path between the two compartments 27 separated by that partition 29, and a control valve 55 for opening and closing the port 53. The control valve 55 comprises a bi-metallic strip which blocks the port 53 when the water temperature is below the predetermined level (which as previously mentioned is 70° C. in this embodiment) and which is caused to bend in response to the water temperature achieving and exceeding the predetermined level so as to deflect away from the port 53 and thereby open the flow path to permit water flow therethrough.

The second flow control means 52 comprises a duct 57 having an intake end 59, and a discharge end 61 terminating at a second port 62 in the respective partition 29. The second flow control means 52 further comprises a valve 63 operable to allow water to flow along the duct 57 from the intake end 59 thereof to the discharge end 61 and through the second port 62. The valve 63 is a one-way valve in the form of a flap valve which can pivot away from the second port 62 in response to flow along the duct 57 from the intake end 59 to the discharge end 61, while preventing reverse flow.

The first flow control means 51 in each partition is positioned towards the upper region of the chamber 25. In this way, water flowing from one compartment 27 to the next compartment through the first port 53 is heated water which has risen towards the upper region of the compartment 27 from which it is flowing.

The second control means 52 is arranged such that the second port 62 is positioned towards the lower region of the chamber, with the intake end 59 of the duct 57 communicating with the upper region of the chamber 25, as shown in the drawings. In this way, water flow from one compartment to the next compartment through the second port 62 is drawn from the upper region of the compartment where the water is likely to be hotter.

Operation of the solar water heater 10 according to the first embodiment will now be described with specific reference to FIGS. 7 and 8 of the drawings. The description will commence from a condition where the water contained within the chamber 25 of the storage tank 13 is cold. When solar radiation falls on the collector 11, thermal energy is transferred to the heat transfer fluid contained in the fluid circuit 15. The heat transfer fluid is caused to flow around the fluid circuit 15 in any suitable way, such as by thermosyphonic action or by a pump. As the heat transfer fluid passes through the heat exchangers 35 it progressively heats the water contained within the compartments 27. The first heat exchanger encountered is that located in the second end compartment 27b and accordingly most heat is transferred to the water contained in that compartment. The amount of heat transferred to water in the subsequent compartments progressively diminishes in the direction towards the first end compartment 27a, until such time as high water temperatures are achieved. Initially, the first flow control means 51 in each partition 29 is closed. Consequently, there can be no movement of water contained within the second end compartment 27b to the next compartment 27c.

As the process continues, the temperature of the water contained in the second end compartment 27b progressively rises until such time as it reaches the predetermined temperature level (which in this embodiment is 70° C.) in the vicinity of the first flow control means 51 in the particular partition 29 adjacent the compartment 27b, whereupon that first flow control means 51 opens to allow heated water to flow into the adjacent compartment 27c, as illustrated in FIG. 7.1 of the drawings. Water in the compartment 27c continues to be heated by way of the heat exchanger 35 until such time as it reaches the prescribed temperature level (which in this embodiment is 70° C.) in the vicinity of the first flow control means 51 in the partition 29 separating that compartment from the next compartment 27d, whereupon that first flow control means 51 opens to allow heated water to flow into the compartment 27d, as illustrated in FIG. 7–2. Simultaneously, cooler water in the compartment 27d flows from that compartment into the compartment 27c to compensate for the hot water flow. The procedure then repeats for water contained in compartment 27d, as illustrated in FIG. 7–4.

With this arrangement, it can be seen that water in the compartments 27 is progressively heated, commencing with the second end compartment 27b and concluding with the first end compartment 27a. In this way, heated water in any one compartment does not flow into the next compartment until such time as it reaches the predetermined temperature level. This ensures that the thermal energy available for heating the water is primarily focused at progressively heating smaller quantities of water, thereby ensuring that a supply of hot water is available without all of the water in the storage tank 13 having had to be heated to the desired temperature level.

Hot water is drawn off as necessary through the outlet 33, with replenishment water being delivered through the inlet 31. The cooling effects of the incoming replenishment water entering the first end compartment 27 is isolated from the hottest water contained within the other end compartment 27b by virtue of the intervening partitions 29 and compartments 27. The cooler water is progressively heated as it successively moves along the compartments 27 to the second end compartment 27b.

If there is insufficient solar radiation available for heating the water contained in the second end compartment 27b to the predetermined temperature level (70° C.), the electric heater 47 can be actuated to provide supplementary heating. In this embodiment, the electric heater 47 is adapted to automatically operate in the event that the water temperature in the second end compartment 27b falls to 50° C.

Figure 9:
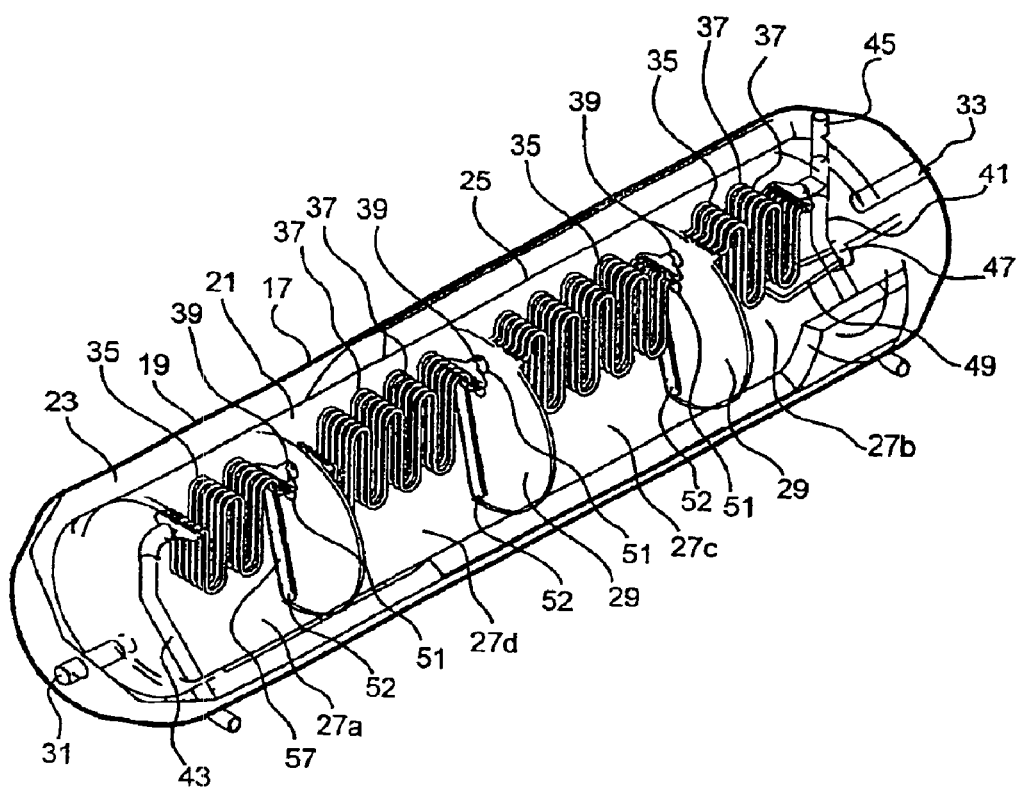
FIG. 9 is a partially cut away schematic perspective view of part of a heater according to a second embodiment.

In the first embodiment, the storage compartments 27 are formed by dividing the chamber 25 with partitions 29. The storage compartments can, of course, be constructed in other ways, one example of which is in a solar water heater according to the second embodiment, as shown in FIG. 9.

In the solar water heater according to the second embodiment, the heat exchangers 35 are configured from a multitude of pipes 37 arranged in a stacked formation. Each pipe 37 meanders in the sense that it comprises a series of 180 degree turns. The pipes 37 extend between the compartments 27 through sealed apertures 39 in the respective partitions 29.

In a solar water heater according to the third embodiment, which is shown in FIGS. 10 and 11, the storage tank 13 comprises a housing 17 accommodating a plurality of reservoirs 71 connected in series, with each reservoir 71 defining a separate storage compartment 27. In most other respects, the third embodiment is similar to the second embodiment and so corresponding reference numerals are used to identify similar parts.

From the foregoing, it is evident that the embodiments each provide a simple yet highly effective arrangement for ensuring that available energy is focused on initially heating part of the water contained in the storage tank 13 rather than the entire volume of water. This ensures that there is no wasteful use of available energy in circumstances where only a small volume of hot water is required. Additionally, it ensures that there is a quantity of hot water available for use well before the entire volume of water within the storage tank 13 is heated to the desired temperature level.

The liquid heater according to the invention is very effective in operation and so provides efficient use of energy, leading to cost-savings to users as well as helping to prevent harmful greenhouse emissions through use of solar radiation rather than fossil fuels as the energy source.

Throughout the specification, unless the context requires otherwise, the word "comprise" or variations such as "comprises" or "comprising", will be understood to imply the inclusion of a stated integer or group of integers but not the exclusion of any other integer or group of integers.

What is claimed is:

1. A liquid heater comprising a plurality of storage compartments for containing liquid to be heated, the storage compartments being connected together in series and comprising at least a first end compartment for receiving liquid to be heated and a second end compartment from which heated liquid can be drawn, a heating means in each compartment for heating the liquid contained therein, a first flow control means operable to allow liquid in one compartment to flow into the next compartment in a flow direction towards the first end compartment when liquid contained in said one compartment reaches a predetermined temperature, and a second flow control means operable to allow liquid flow from one compartment to the next compartment in a flow direction towards the second end compartment while preventing reverse flow.

2. A liquid heater as claimed in claim 1 wherein the plurality of storage compartments are defined by at least one reservoir partitioned to provide the plurality of storage compartments.

3. A liquid heater as claimed in claim 1 wherein the plurality of storage compartments comprise a plurality of reservoirs arranged in series, each reservoir defining a respective one of the storage compartments.

4. A liquid heater as claimed in claim 3 wherein each heating means comprises a heat exchanger.

5. A liquid heater as claimed in claim 4 wherein each heat exchanger is thermally connected to a solar radiation collector by a thermal connection.

6. A liquid heater as claimed in claim 5 wherein said thermal connection between each heat exchanger and the solar radiation collector comprises a fluid circuit containing a heat transfer fluid, with the heat transfer fluid being for receiving heat from the solar radiation collector and transferring it to the liquid in the storage compartments through the heat exchangers.

7. A liquid heater as claimed in claim 6 wherein the heat exchangers are incorporated in series in the fluid circuit.

8. A liquid heater as claimed in claim 6 wherein the heat transfer fluid contained in the fluid circuit comprises distilled water.

9. A liquid heater as claimed in claim 4 wherein each heat exchanger comprises a plurality of flow paths arranged in parallel and configured in a spiral arrangement.

10. A liquid heater as claimed in claim 4 wherein each heat exchanger comprises a plurality of flow paths arranged in a stacked formation and configured in a meandering arrangement.

11. A liquid heater as claimed in claim 1 further comprising supplementary heating means to supplement the heating means in each compartment.

12. A liquid heater as claimed in claim 11 wherein the supplementary heating means is an electric heater.

13. A liquid heater as claimed in claim 11 wherein the supplementary heating means is arranged to heat liquid contained in the second end compartment.

14. A liquid heater as claimed in claim 1 wherein the first flow control means is located above the second flow control means.

15. A liquid heater as claimed in claim 1 wherein the first flow control means comprises a first flow path and a control valve for opening and closing the first flow path, the control valve moving from the closed condition to the open condition when the temperature of a portion of water in the particular compartment reaches said predetermined temperature.

16. A liquid heater as claimed in claim 15 wherein the second flow control means comprises a second flow path and a valve operable to allow liquid to flow along the second flow path in a flow direction towards the second end compartment while preventing flow along the second flow path in the reverse direction.

17. A liquid heater as claimed in claim 16 wherein the first flow control means is located above the second flow control means.

18. A liquid heater as claimed in claim 16 wherein the second flow path is defined by a duct comprising an intake end and a discharge end, with the intake end being located above the discharge end.

19. A liquid heater as claimed in claim 18 wherein the intake end of the duct through which liquid can leave that compartment is located in close proximity to the respective first flow path through which liquid can enter the compartment.

20. A liquid heater as claimed in claim 19 wherein the plurality of storage compartments are defined by at least one reservoir partitioned to provide the plurality of storage compartments and the plurality of storage compartments comprise a plurality of reservoirs arranged in series, each reservoir defining a respective one of the storage compartments, further wherein the heat exchangers are incorporated in series in the fluid circuit.

* * * * *